United States Patent Office

3,845,155
Patented Oct. 29, 1974

3,845,155
ALKYLATING OLEFINS OVER ETA-ALUMINA/
ZIRCONIA CATALYST
Louis F. Heckelsberg, Bartlesville, Okla., assignor to
Phillips Petroleum Company
No Drawing. Filed Feb. 12, 1973, Ser. No. 332,001
Int. Cl. C07c 1/20
U.S. Cl. 260—682                      9 Claims

ABSTRACT OF THE DISCLOSURE

An olefin feed is reacted with a monohydric alcohol or a dialkyl ether in the absence of free oxygen and in contact with a catalyst consisting essentially of eta-alumina and zirconia, the zirconia being present in an amount in the range of about 0.1 to about 20 weight percent of the catalyst, to produce an olefin product having at least one more carbon atom than the olefin feed.

---

The ability to convert olefinic compounds to other, perhaps less plentiful and perhaps more valuable, olefinic compounds is continuously being sought after. There are a number of procedures such as dimerization, disproportionation, methylation, and the like which are capable of carrying out such transformations.

In U.S. 3,082,272, Robert B. Long suggests that an olefin be reacted with methanol in the presence of a solid dehydrogenation catalyst such as alumina, silica gel, kieselguhr, molecular sieves, thoria, zirconia, ceria, zinc oxide, and mixtures of these oxides to effect the addition of a methyl radical to the compound. Long utilizes alumina or molecular sieve catalysts in each of his examples and states that these materials are his preferred catalysts. However, in each instance the percent of the feed converted and/or the selectivity for the desired methylated products were low. Although Mr. Long suggested that some of his metal oxide catalysts could be combined, it has been discovered that many of the proposed combinations are detrimental to the percent feed conversion and/or the selectivity to the desired methylated products. Thus the need for more commercially acceptable alkylation catalysts has continued.

Accordingly, it is an object of the present invention to provide a new and improved process for alkyalting olefins to higher olefins. Another object of the invention is to increase the yield of the higher olefins. Yet another object of the invention is to provide a new and improved catalyst for the methylation of olefins. A further object of the invention is to provide a process for alkylating olefins to higher olefins which provides higher selectivity for the desired products. Other objects, aspects and advantages of the invention will be apparent from a study of the specification and the appended claims to the invention.

In accordance with the present invention I have discovered that the alkylation of an olefin feed with an alcohol or dialkyl ether can be improved by employing a catalyst consisting essentially of eta-alumina and zirconia, with the zirconia being present in an amount in the range of about 0.1 to about 20 weight percent of the catalyst. I have also discovered that the selectivity for the desired alkylated product can be increased by employing a catalyst consisting essentially of eta-alumina and zirconia wherein the zirconia is present in an amount in the range of about 1 to about 8, more preferably about 2 to about 7, weight percent of the catalyst.

The olefinic feedstocks which are applicable for conversion according to the process of the present invention are mono- and diolefinic hydrocarbons which contain 3 to 20, preferably 4 to 10, carbon atoms per molecule. These can be branched or unbranched, terminal olefinic or internal olefinic, cyclic or acyclic. Some examples of these are propylene, 2-butene, isobutene, 1,3-butadiene, 3-methyl-1-butene, 2-methyl-2-butene, isoprene, 2,3-dimethyl-2-butene, cyclopentadiene, 2-ethyl-1-hexene, cyclooctene, 1-decene, 2-eicosene, and the like, and mixtures thereof. Particularly advantageous results are obtained with $C_4$ to $C_{10}$ acyclic monoolefins. Such feedstocks can be diluted with paraffins, such as in a number of olefinic refinery streams.

The alcohols which can be used in the process of the present invention are lower monohydric alcohols having from 1 to 6 carbon atoms per molecule. Some examples of these are methanol, ethanol, isopropanol, secondary butanol, tertiary butanol, 2-methylbutanol, normal hexanol, and the like, and mixtures thereof. Methanol is particularly effective in adding one or more methyl groups to an olefinic molecule.

The dialkyl ethers which can be employed in the invention have the structure R—O—R', wherein R and R' are the same or different alkyl groups having 1 to 6 carbon atoms. Examples of suitable dialkyl ethers include dimethyl ether, methyl ethyl ether, diethyl ether, methyl propyl ether, methyl n-butyl ether, diisopropyl ether, ethyl butyl ether, dibutyl ether, dihexyl ether, and mixtures thereof. The dimethyl ether is particularly effective for methylation processes. The use of a dialkyl ether instead of an alcohol reduces the amount of water produced during the alkylation process.

The catalyst of the present invention can be prepared by any suitable method. The presently preferred preparative methods include impregnating a preformed eta-alumina catalyst base with a dispersion or solution of a zirconium compound followed by drying and calcination, and the physical admixing of eta-alumina and zirconia or eta-alumina and a zirconium compound by suitable techniques such as ballmilling, followed by calcination. In general, zirconium, calculated as zirconia, will constitute from about 0.1 to about 20 weight percent of the catalyst. However, in the presently preferred embodiment for achieving increased selectivity for the desired alkylated product, zirconium, calculated as zirconium, will constitute from about 1 to about 8 weight percent of the total catalyst, with a zirconia content in the range of about 2 to about 7 weight percent of the total catalyst being more preferred.

The catalyst composition can be conveniently viewed and calculated as a mixture of oxides. However, various compounds of zirconium which are convertible to zirconia under the calcining conditions, can be added to the eta-alumina. Thus, zirconium nitrate, $Zr(NO_3)_4 \cdot 5H_2O$, zirconium oxalate, zirconium tetraacetate, zirconium tetraacetylacetonate, ammonium zirconyl carbonate, and the like, and admixtures thereof can be impregnated on or admixed with eta-alumina particles and then subjected to calcining conditions in the presence of free oxygen to convert the zirconium compound to zirconia. It is desirable to avoid the use of halides as the presence of halides in the final catalyst appears to be detrimental to the desired alkylation reaction. However, where the undesirable contaminants can be washed from the catalyst or volatilized during calcining of the catalyst, zirconium compounds containing such contaminants can be employed. If the contaminants are not detrimental to the catalyst or the desired reaction, small amounts of such contaminants can be tolerated in the final catalyst.

Such catalysts, once they are suitably prepared in the solid calcined form, need not be completely free of combined water and, therefore, need not necessarily be subjected to a high temperature recalcination before use. As a general rule, however, the catalysts are calcined for about 0.1 to about 25 hours at a temperature in the range of about 800° F. to about 1500° F. before use. After being in service for some time, the catalysts will generally be reduced in effectiveness, primarily due to the buildup of coke. Any suitable catalyst regeneration procedure can be used to remove the coke, such as by heating the catalyst in the presence of diluted air.

Suitable mixtures of the olefinic feedstocks and of the lower alcohols are contacted with the catalyst, preferably under continuous conditions such as in a fixed bed reactor or a fluidized bed reactor, at temperatures in the range of about 550° F. to about 1000° F., preferably in the range of about 700° F. to about 900° F., and in the at least substantial absence of free oxygen. Any convenient pressure can be used and pressures of 0 to 1000 p.s.i.g. are generally employed, with a pressure in the range of about 100 to about 500 p.s.i.g. being preferred. The space rate will depend upon other conditions but will generally be in the range of about 0.1 to about 25 weight hourly space velocity (WHSV), and preferably will be in the range of about 1 to about 5 WHSV.

The ratio of alcohol or dialkyl ether to olefinic feedstock can vary over a broad range but will, most often, be in the range of about 0.1 to about 5.0, preferably in the range of about 0.2 to about 3.0 mole of alcohol or dialkyl ether per mole of olefinic feedstock. Still greater ratios of alcohol or dialkyl ether to olefinic feedstock can be used and will tend to produce still higher molecular weight products but at the expense of efficiency.

On leaving the reaction zone, the reaction mixture will contain olefinic products having at least 1 more carbon atom per molecule than the corresponding olefinic feedstock material. Depending upon the conditions and the nature of the alcohol or dialkyl ether, significant amounts of materials which have been increased by 2 or more carbon atoms per molecule can also be present. The reaction effluent can also contain minor amounts of carbon monoxide, methane, hydrogen, and carbon dioxide. Water can also be present, particularly when alcohols are used. Some olefinic materials can also have been converted to paraffinic materials of higher molecular weight.

The mixture which leaves the reaction zone can be separated in any conventional way, such as by fractionation, to separate and isolate the desired products. Unconverted materials can be recycled to the reaction zone.

The following example is presented in further illustration of the invention, but should not be construed in undue limitation thereof.

EXAMPLE

In each of the following runs, 5 ml. of catalyst is charged to a tubular reactor having an internal diameter of about 10 mm. The layer of catalyst is then covered with 4 ml. of glass balls having a diameter of about 3 mm. The catalyst is then activated by passing dry air through the tubular reactor for four hours at a temperature of about 1000° F. The catalyst is then cooled to about 800° F. in a nitrogen atmosphere, after which the feed is admitted to the reactor.

The following results were obtained using a feed consisting of butene-2 and dimethyl ether (DME) in the ratios shown and in the absence of free oxygen.

TABLE I

| Run No. | Catalyst description | Grams | Feed wt. ratio butene-2/DME | Space rate, WHSV | Average reactor Temp., °F. | Average reactor Pressure, p.s.i.g. | Conversion,[a] percent | Selectivity,[b] percent |
|---|---|---|---|---|---|---|---|---|
| 1 | Alumina | 4.00 | 77/23 | 2.1 | 804 | 284 | 45 | 22 |
| 2 | ZnO | 8.60 | 77/23 | 1.2 | 808 | 299 | 30 | 8 |
| 3 | 85/15 Al$_2$O$_3$/SiO$_2$ | 2.73 | 75/25 | 3.1 | 800 | 301 | 27 | 31 |
| 4 | 5/95 ZrO$_2$/eta-alumina [d] | 3.18 | 74/26 | 2.7 | 824 | 311 | 31 | 48 |
| 5 | Eta-alumina | 2.85 | 74/26 | 3.0 | 830 | 312 | 43 | 35 |
| 6 | Thorium titanate | 4.60 | 74/26 | 2.1 | 820 | 338 | 29 | 2 |
| 7 | 10/90 ZrO$_2$/eta-alumina [d] | 4.00 | 74/26 | 1.6 | 826 | 340 | 49 | 35 |
| 8 | Alumina (Girdler's) | 3.76 | 74/26 | 2.2 | 833 | 317 | 38 | 24 |
| 9 | Al$_2$ThO$_5$ [e] | 7.10 | 74/26 | 1.3 | (c) | 281 | 19 | 4 |
| 10 | Alumina (Alon C) | 2.05 | 74/26 | 3.0 | 797 | 310 | 39 | 31 |

[a] Conversion of total feed, weight percent.
[b] Weight percent of C$_5$ and C$_6$ products, based on total converted products.
[c] Thermocouple broke, average temperature believed to be approximately 800° F.
[d] Preparation of zirconia-promoted eta-alumina catalysts is accomplished by impregnating the support with an aqueous solution of Zr(NO$_3$)$_4$·5H$_2$O. Sufficient zirconium nitrate is used to provide the desired amount of zirconia (ZrO$_2$) in the calcined composite.
[e] Al$_2$O$_3$·ThO$_2$ (1/1 molar ratio).

The utilization of 10 weight percent zirconia on the eta-alumina provides a significant increase in conversion at high space rates while maintaining a good selectivity. The utilization of about 5 weight percent zirconia on the eta-alumina provides the highest selectivity I have found for this reaction. In contrast zinc oxide, thorium titanate, and an admixture of alumina and thorium oxide provided very low values of selectivity.

Reasonable variations and modifications are possible within the scope of the foregoing disclosure and the appended claims to the invention.

That which is claimed is:

1. A process for alkylating an olefin feed selected from monoolefinic and diolefinic hydrocarbons containing from 3 to 20 carbon atoms per molecule, which comprises reacting under suitable reaction conditions said olefin feed with at least one dialkyl ether containing from 1 to 6 carbon atoms per alkyl group, in contact with a catalyst consisting essentially of eta-alumina and zirconia, the zirconia being present in an amount in the range of about 0.1 to about 20 weight percent of the catalyst, to produce an olefin product having at least one more carbon atom than said olefin feed, said reaction conditions comprising an at least substantial absence of free oxygen.

2. A process in accordance with claim 1 wherein said reaction conditions comprise a temperature in the range of about 550° to about 1000° F., a pressure in the range of about 0 to about 1000 p.s.i.g., a weight hourly space velocity in the range of about 0.1 to about 25, and a molar ratio of said dialkyl ether to said olefin feed in the range of about 0.1 to about 5.

3. A process in accordance with claim 1 wherein said reaction conditions comprise a temperature in the range of about 700° to about 900° F., a pressure in the range of about 100 to about 500 p.s.i.g., an absence of free oxygen, a weight hourly space velocity in the range of about 1 to about 5, and a molar ratio of said dialkyl ether to said olefin feed in the range of about 0.2 to about 3.

4. A process in accordance with claim 1 wherein the zirconia is present in the catalyst in an amount in the range of about 1 to about 8 weight percent of the catalyst.

5. A process in accordance with claim 1 wherein the zirconia is present in the catalyst in an amount in the range of about 2 to about 7 weight percent of the catalyst.

6. A process in accordance with claim 5 wherein at least 40 weight percent of the olefin feed consumed in the reaction is converted to the desired alkylated olefin product.

7. A process in accordance with claim 6 wherein the zirconia constitutes about 5 weight percent of the catalyst.

8. A process in accordance with claim 7 wherein said olefin feed comprises 2-butene, and wherein the 2-butene is reacted with dimethyl ether to produce pentenes and hexenes.

9. A process in accordance with claim 8 wherein said reaction conditions comprise a temperature in the range of about 700° to about 900° F., a pressure in the range of about 100 to about 500 p.s.i.g., an absence of free oxygen, a weight hourly space velocity in the range of about 1 to about 5, and a molar ratio of dimethyl ether to 2-butene in the range of about 0.2 to about 3.

References Cited

UNITED STATES PATENTS

| 3,621,072 | 11/1971 | Kobe et al. | 260—681 |
| 3,642,930 | 2/1972 | Grasselli et al. | 260—681 |
| 3,082,272 | 3/1963 | Long | 260—682 |
| 3,642,933 | 2/1972 | Heckelsberg | 260—683.2 |

PAUL M. COUGHLAN, JR., Primary Examiner

U.S. Cl. X.R.

260—681